March 22, 1949.                G. F. JOHNSON                2,464,867
                                  DOG HARNESS
                               Filed June 15, 1946
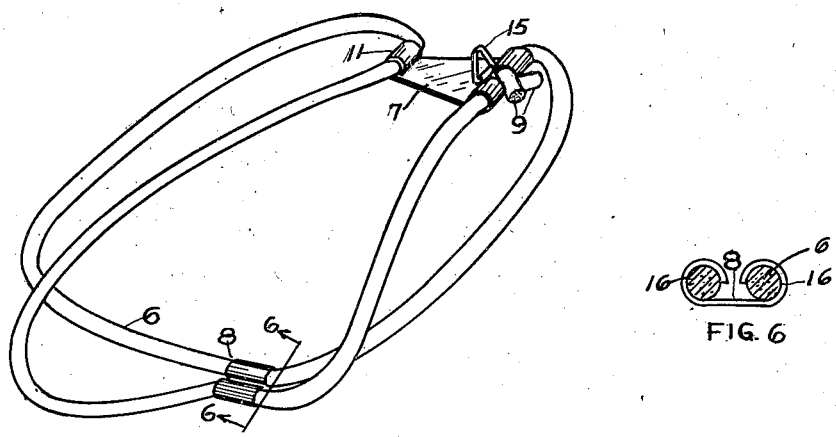
FIG. 1
FIG. 6
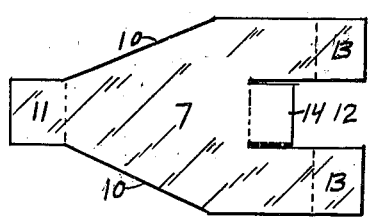
FIG. 5
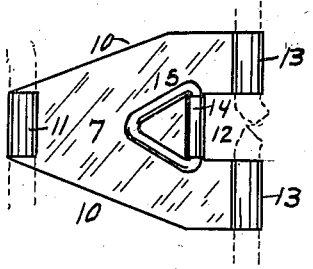
FIG. 2
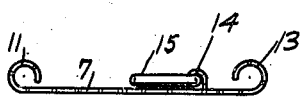
FIG. 3
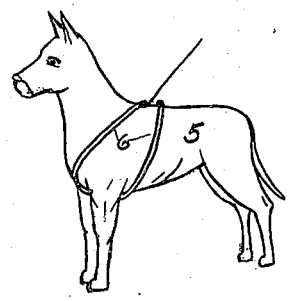
FIG. 4
INVENTOR.
GAY F. JOHNSON
BY
*Martin E. Anderson*
ATTORNEY Patented Mar. 22, 1949

2,464,867

UNITED STATES PATENT OFFICE 2,464,867

DOG HARNESS

Gay F. Johnson, Denver, Colo.

Application June 15, 1946, Serial No. 677,054

1 Claim. (Cl. 119—96)

This invention relates to improvements in dog harnesses.

It is the principal object of this invention to produce a dog harness that shall be strong, of a very simple construction, and which can be manufactured at a comparatively small cost.

Another object is to produce a harness that can be easily and quickly applied and adjusted to the size of the dog. A further object is to produce a harness that cannot accidentally become detached.

A still further object is to produce a harness which shall have a pleasing and ornamental appearance.

The above and any other objects that may become apparent as this description proceeds are attained by means of a construction and an arrangement of parts that will now be described in detail and reference for this purpose will be had to the accompanying drawing in which the invention has been illustrated in its preferred form, and in which:

Figure 1 is a perspective view of the harness showing the same detached from the dog.

Figure 2 is a top plan view of a metal connector, which forms the principal element of the harness;

Figure 3 is an edge view of the connector shown in Figure 2.

Figure 4 is a side view of a dog showing the harness in place thereon.

Figure 5 shows the blank from which connector 7 is formed, and;

Figure 6 is a section taken on line 6—6, Figure 1.

In the drawing, reference numeral 5 designates the dog and shows in a general way the appearance of the harness when in use.

The harness as it appears when detached from the dog is shown in Figure 1 in which numeral 6 designates a cord of any suitable kind, which may be formed from braided cotton. The cord is one continuous piece. At a point mid-way between the ends of the cord, a connector plate 7 is positioned. The two sides of the cord are connected at the bottom by a clip 8. The ends of the cord have been designated by numeral 9.

Referring now to Figures 2 and 3, it will be seen that clip 7 is formed from a piece of sheet metal, preferably steel. The metal should preferably be rust proof, or it must be coated with chromium or other rust proof material. The blank is shaped as shown in the drawing having inclined side edges that terminate in a tongue 11, whose sides are preferably parallel. The wide end of the blank has a central notch 12, which separates it into two spaced fingers 13. A portion of the material cut loose in forming notch 12 is left and has been designated by reference numeral 14.

After the blank has been cut into the shape shown in Figure 5, tongue 14 is bent about the straight side of the triangular ring 15, and fingers 13 are bent into the position shown in Figure 3, leaving them partly open, and the same is true of ends 16 of clip 8, see Figure 6.

Cord 6 is now inserted in the loop formed by tongue 11, bringing the latter to a point midway between the ends of the cord. Tongue 11, is now bent, decreasing the area of the loop and clamping the connector fast to the cord.

The ends of the cord are now threaded through the loops in member 8, and are left so that this member can be moved, so as to effect adjustments in fitting the harness to a dog.

The head of the dog is now inserted in the loop between 11 and 8 and the cords are then brought up over the sides of the dog, behind the front legs, as shown in Figure 4. The ends are now inserted in the loops formed by tongues 13, and adjusted as to size. Loops 13 are now decreased in size by bending the encircling wall inwardly until the cord is clamped firmly in position. The ends of the cord are now cut, leaving the parts as shown in Figure 1.

The harness can be adjusted to fit dogs of different sizes. It is, however, contemplated to make the harness in three different sizes so that all dogs may be fitted.

From the above description, it will be apparent that the harness described, and illustrated on the drawing is simple and inexpensive. The connector 7 can be formed by a simple cutting die and curved by a simple forming die or by a simple hand operated device. Clip 8 is also very simple.

The parts are secured to the cords by simply compressing the loops, which may be readily done with an ordinary pair of pliers.

By providing a cord of sufficient length, any dog can be fitted. It is more economical to provide three different lengths of cords or three different sizes, from which the nearest size can be selected.

The cord can be of any color desired, and be made of any suitable material, such as cotton, rayon, plastic, or leather. If flat straps are used instead of round cords, the loops must be correspondingly shaped.

Having described the invention what is claimed as new is:

A dog leash harness, comprising a single piece of flexible material adapted to pass around the neck and the body of a dog, a metal connector having a loop at one end firmly attached to the flexible member approximately at its middle point, the other end of said connector having two loops substantially parallel with the first loop for receiving the free ends of the flexible member and securing same thereto, the connector being positioned over the withers, a clip connecting the two parts of the flexible member below the chest, positioned approximately between the front legs, the two halves of the flexible member passing from the connector, downwardly in front of the dog's shoulders, between the front legs, thence upwardly on the same side and through said two loops on the connector, respectively, and a ring for receiving a leash ring pivotally connected with the upper surface of the connector.

GAY F. JOHNSON.

REFERENCES CITED

The following references are of record in the file of this patent:

UNITED STATES PATENTS

| Number | Name | Date |
| --- | --- | --- |
| 278,931 | Gibbons | June 5, 1883 |
| 296,076 | Shelby | Apr. 1, 1884 |
| 1,614,083 | Plantico | Jan. 11, 1927 |
| 1,800,421 | Wickersham et al. | Apr. 14, 1931 |
| 1,879,991 | Pratt | Sept. 27, 1932 |
| 1,906,043 | Bernstein | Apr. 25, 1933 |
| 2,187,021 | Everson | Jan. 16, 1940 |
| 2,196,627 | De Sanctis | Apr. 9, 1940 |
| 2,233,397 | Bloom | Mar. 4, 1941 |